Patented Dec. 8, 1925.

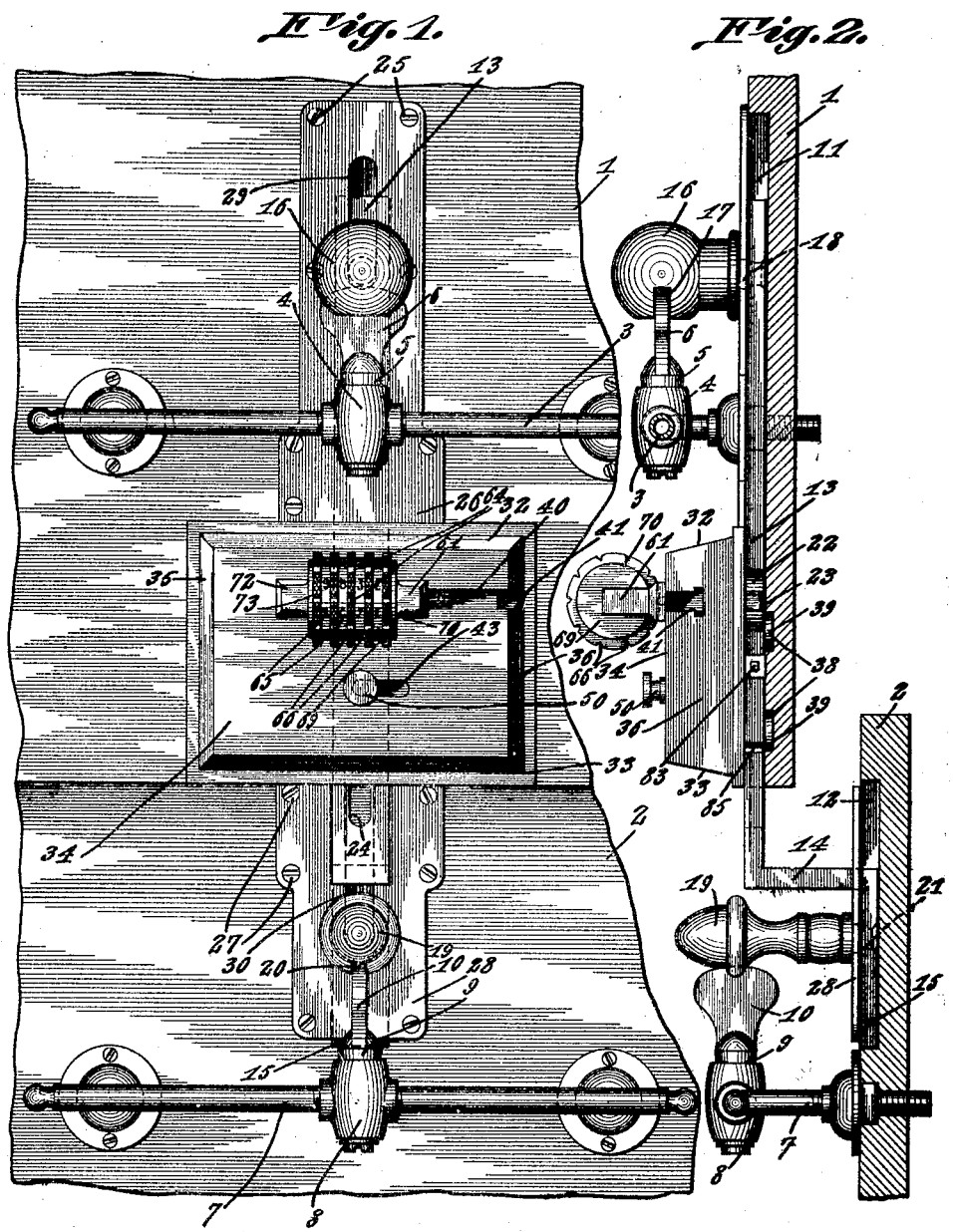

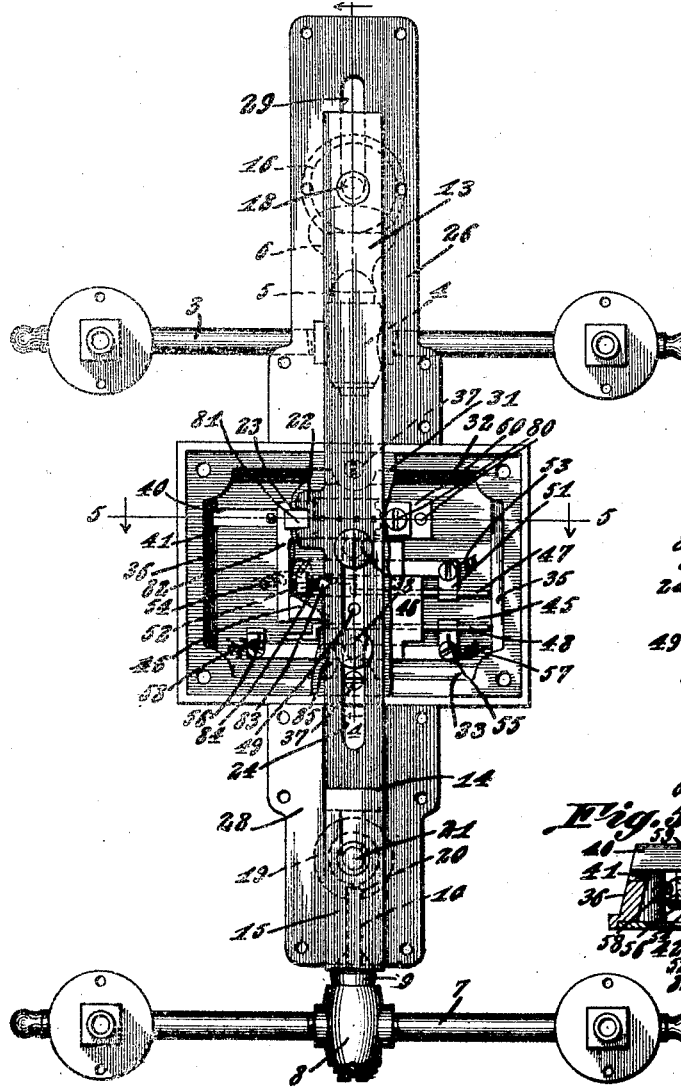

1,564,528

UNITED STATES PATENT OFFICE.

JOSEPH CARTELLI, OF BROCKTON, MASSACHUSETTS.

LOCKING ATTACHMENT.

Application filed June 24, 1925. Serial No. 39,278.

*To all whom it may concern:*

Be it known that I, JOSEPH CARTELLI, a citizen of the United States, residing at Brockton, in the county of Plymouth and State of Massachusetts, have invented certain new and useful Improvements in Locking Attachments, of which the following is a specification.

This invention relates to a locking attachment for use in connection with motor vehicles, and has for its object to provide, in a manner as hereinafter set forth, a locking attachment for not only maintaining the gasoline or fuel supply line closed to the motor cylinders when the vehicle in not in use, but also for maintaining the ignition system open when the fuel line is closed, under such conditions preventing operation of the vehicle by unauthorized persons.

Further objects of the invention are to provide, in a manner as hereinafter set forth, a locking attachment for the purpose referred to, which is simple in its construction and arrangement, strong, durable, compact, readily installed with respect to the body of the vehicle, fuel supply line and ignition system, thoroughly efficient in its use, conveniently operated to released position, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a locking attachment, in accordance with this invention, and further illustrating the same connected to the forward wall of the compartment of the vehicle.

Figure 2 is a slide elevation of the locking attachment.

Figure 3 is a rear elevation of the locking attachment disconnected from the vehicle.

Figure 4 is a section on line 4—4, Figure 3

Figure 5 is a section on line 5—5, Figure 3.

In Figures 1 and 2 of the drawings, the forward wall of the compartment of a vehicle is illustrated, and by way of example, said forward wall consists of an upper section 1 and a lower section 2 arranged forwardly with respect to the upper section 1, and said upper section 1 constitutes what may be termed the dash or instrument board of the vehicle. Secured to and projecting outwardly from the upper section 1 is a yoke-shaped tubular extension 3 which opens into the gasoline or fuel supply line and said extension 3 is provided with a cutoff 4 spaced from the outer face of the upper section 1, and said cutoff 4 includes a plug 5 provided with a thumb piece 6. Connected to the lower section 2 and projecting outwardly therefrom is a yoke-shaped tubular extension 7, which opens into a gasoline or fuel supply line, and the extension 7 is provided with a cutoff 8 including a stem 9 formed with a thumb piece 10. The cutoffs 4, 8, are employed for shutting off the supply of fuel to the motor cylinders, or rather to the carbureter or carbureters of the motor. When the cutoffs 4 and 8 are in closed position, the thumb piece 6 is disposed at right angles with respect to the thumb piece 10, and said thumb pieces are engaged by a key released locking means for the purpose of maintaining the cutoffs in closed position to discontinue the supply of fuel to the motor cylinders. The manner in which the cutoffs are maintained in closed position will be presently referred to.

The section 1 is formed with a vertically extending groove 11, closed at its upper end and open at its lower end, and the section 2 is formed with a vertically disposed groove 12 arranged in a plane parallel to the groove 11, and the said grooves provide guide passages for a locking element consisting of a vertically movable bar formed of an upper portion 13, an intermediate portion 14, and a lower portion 15. The portion 14 extends at right angles with respect to the lower end of the portion 13 and merges into the upper end of the portion 15.

The bar is rectangular in cross section and the portion 13 thereof is slidably mounted in the groove 11 and the portion 15 slidably mounted in the groove 12. The portion 15 extends in a plane parallel to the plane of the portion 13, and the latter at its upper end has projecting outwardly therefrom at right angles a locking knob 16, formed with a groove 17 for the reception of the upper end of the thumb piece 6. The knob 16 includes a shank 18, which is fixedly secured to the portion 13 of the bar. Extending outwardly from the portion 15 of the bar, as well as disposed at right angles with respect thereto, is a locking knob 19, provided with a groove 20 for the reception of the upper end of the thumb piece 10. The knob 19 includes a shank 21, which is fixedly secured to the portion 15 of the bar, and said knob 19 is disposed at right angles with respect to said portion 15. The knob 19 is arranged below the intermediate portion 14 of the bar and projects beyond the portion 13 of the bar. When the thumb pieces 6 and 10 are engaged respectively in the grooves 17 and 20, the cutoffs 4 and 8 are maintained in closed position. The portion 13 of the bar, at a point between its transverse center and lower end, has projecting from one side edge thereof a lateral extension 22 formed in its free end with a notch 23, and said portion 13 of the bar, below the extension 22, is provided with a lengthwise extending slot 24 for a purpose to be presently referred to.

Secured to the section 1, by the hold-fast devices 25, is a vertically disposed retaining plate 26 for the portion 13 of the bar, and secured to the section 2, by the hold-fast devices 27, is a vertically disposed retaining plate 28 for the portion 15 of the bar. The plate 26 is provided with a centrally disposed lengthwise extending slot 29 to provide a clearance for the shank 18 of the knob 16 when the latter is moved from and to engagement with the thumb piece 6. The plate 28 is formed with a centrally disposed lengthwise extending slot 30 to provide a clearance for the shank 21 when the knob 19 is moved from and to engagement with the thumb piece 10.

When the bar is in its lowered position, the knobs 16 and 17 overlap respectively the upper ends of the thumb pieces 6 and 10 for the purpose of locking the cutoffs 4 and 8 in closed position, and a means is employed, to be hereinafter referred to, for releasably securing the locking element in lowered position.

Secured to the section 1 and abutting against the lower end of the plate 26 is a housing comprising a rear wall 31, a top wall 32, a bottom wall 33, a front wall 34, and a pair of end walls 35, 36. The rear wall 31 is detachably secured to the top and bottom walls 32, 33, by the hold-fast devices 37. The housing is secured to the section 1 in any suitable manner, and if desired the plates 26 and 28 can be formed integral with the housing. Connected to the rear wall 31 is a pair of headed studs 38, which extend through the slot 24 and have their heads seated in sockets 39 formed in the section 1. The studs 38 constitute combined guide and retaining means for the bar of the locking element and said studs constitute means for limiting the upward and downward movement of the bar of the locking element.

The top wall 34 is formed with a slot 40 and the end wall 36 is also provided with a slot 41 of a length greater than the width of the slot 40 and with one side of the slot 41 communicating with the outer end of the slot 40. The rear wall 31 is formed with a slot 42, of less length than the slot 40, but arranged parallel to the latter. The front wall 34 is also provided with a slot 43 extending at one side from the vertical median thereof and arranged parallel to the slot 40. The inner face of the front wall 34 is formed with a pocket 44, into which opens the slot 43.

Mounted in the pocket 44 is a plate 45 of insulation and which is formed with a slot 44' registering with the slot 43. Slidably mounted against the plate 45 is a carrier 46 provided with a pair of circuit opening and closing members 47, 48, and said carrier when shifted in one direction closes the ignition system and when shifted in the opposite direction opens said system or circuit. The carrier closes the ignition system when the cutoffs 5 and 8 are open, but maintains said ignition system open when the cutoffs 5 and 8 are closed to discontinue the fuel supply. Secured to the carrier 46 and extending outwardly through the slots 44, 44' is a shifting member 49 therefor and which has its outer end provided with an enlarged head piece 50, and the latter facilitates the shifting of the carrier 46 and further abuts against the wall 34 for the purpose of maintaining the carrier against the plate 45.

Secured against the inner face of the front wall 34 of the housing, is a pair of spaced contacts 51 and 52, having connected therewith circuit wires 53, 54 respectively, forming elements of the ignition system. The circuit opening and closing member 47 is permanently in engagement with the contact 51, and when the carrier 46 is shifted towards the end wall 36, the member 47 will engage the contact 52 and bridge the space between said contacts, thereby closing the ignition circuit, and said circuit is closed when the fuel supply is open.

Secured to the inner face of the front wall 34 of the housing is a pair of spaced contacts 55, 56, and connected therewith are circuit wires 57, 58 respectively of the ignition system. The member 48 is permanently in engagement with the contact 55, and when the carrier is shifted towards the wall 36 the member 48 will engage contact 56, thereby bridging the space between contacts 55 and 56 and close the ignition circuit, but the closing of said circuit is only had when the fuel supply line is open. When the fuel supply is closed the member 48 is out of engagement with contact 56.

The carrier 46 is maintained in position to provide for the opening of the ignition circuit through the medium of a permutation locking mechanism, and the latter further acts as a means for retaining the locking element in position to maintain the fuel supply line closed when the vehicle is not in operation. The said permutation locking mechanism comprises a bar 59, having secured to its lower face a plate 60. The bar 59 and plate 60 are bodily movable. The bar 59 is mounted in the slot 40 and the plate 60 is of a width greater than the width of the bar 59 and rides against the inner face of the front wall 34 of the housing, and said bar acts as a means to prevent the pulling out of the bar 59 in an outward direction with respect to the housing. The slot 41 provides a clearance for the plate 60 when the bar 59 is moved towards the wall 36, or in other words, the length of the slot 41 is such that the bar 59 and plate 60 can be removed from the housing when occasion requires. Formed integral with one end of the bar 59 is a support 61, which overlaps the walls of the slot 40, and said support 61, in connection with the plate 60, slidably connects the bar 59 to the front wall 34 of the housing. Formed integral with the inner side of the support 61, at the outer end thereof, is a cylindrical shaft 62, formed with a lengthwise extending inverted T-shaped groove 63, opening at the top of the shaft 62, and adjustably mounted on the shaft 62 is a series of permutation disks 64, each having suitable indicia, as at 65, and further having the outer edge thereof formed with spaced notches 66. Each of said disks 64 is formed with a reduced web 67 having a groove 68.

The support 61 is flanged, as at 69, and attached to the shaft 62 is a collar 70 which, in connection with the flange 69, maintains the disks 64 on the shaft 62. The collar 70 is secured to the shaft 62 by the hold-fast devices 71.

Fixedly secured to the wall 34 of the housing and extending across the inner end of the slot 40, is a support 72 carrying a flange 73 and a notched locking member 74, which extends into the groove 63 and also at one side of the webs 67 of the disks 64 and is further adapted to extend in the grooves 68. The notches of the member 74 are indicated at 75 and said member 74 corresponds in contour to the shape of the groove 63. The disks 64 can be revolved around the shaft 62 when the locking member 74 is mounted therein and projected therefrom, and when the grooves 68 align with the projections 76 formed by the notches 75, the support 61 can be shifted free of the locking member 74, but when the projections 76 are out of alignment with respect to the grooves 68, the support 71 together with the shaft 62 cannot be shifted from the locking member. The shaft 62, support 61, bar 59 and plate 60 are bodily shifted together.

The bar 59 is provided with a series of openings 77, and in each of which is arranged a spring controlled plunger 78 engaging in a notch 66 to releasably secure a disk 64 in set position. The plate 60 is formed with openings 79 to provide guides for the plunger stems and said plate 60 confines the controlling springs for the plungers within the opening 77. The plate 60 is secured to the bar 59 by hold-fast devices 80.

The permutation locking mechanism further includes a locking member for the locking element, and said locking member is in the form of an arm 81 which projects inwardly from one end of the bar 59 and is adapted to engage in the notch 23 of the offset portion 22 formed on the portion 13 of the bar of the locking element. Fixed to the arm 81 is a shifting member 82, which acts as a means to shift the arm 82 when the carrier 46 is manually shifted and which further acts as a means to shift the carrier 46 when the support 61 is manually shifted.

A spring controlled retaining lug 83 is carried by the rear wall 31 of the housing and is adapted to engage in a notch 84 or a notch 85 for retaining the bar of the locking element in an elevated or lowered position. The notches 84 and 85 are spaced from each other and arranged in one side edge of the portion 14 of the bar of the locking element and when the lug 83 engages in the notch 84 the bar is in its lowered position, and when engaged in the notch 85 the bar is held in elevated position.

It will be assumed that the locking element is in the position as shown in Figures 1 and 2, that is to say in engagement with the thumb pieces 6 and 10 of the cutoffs 4 and 8, and when so engaged the cutoffs are in closed position. When the cutoffs are in closed position, the circuit opening and casing members 47 and 48 are in the position shown in Figure 3, that is to say, clear of the contacts 52 and 56, under such conditions the ignition circuit is open. The locking element and carrier 46 are retained in the position shown in Figures 1, 2 and 3 by the permutaton locking mechanism in view of the fact that the arm 81 is engaged in the notch 23 and the shifting member 82 abuts against the carrier 46, thereby preventing the shifting thereof.

Now if it is desired to release the locking element and carrier, the disks 64 are adjusted to a position whereby the supports 61, shaft 62, bar 59 and plate 60 can be bodily shifted from connection with the locking member 74. After the disks 64 have been set to the position just referred to, the head 50 of the shifting screw 49 is grasped by the operator and the said shifting screw is moved to the right end of the slot 43 and which shifts the carrier 46 therewith, and as the carrier shifts in such direction it carries the shifting member 82 therewith, which in turn moves the arm 81 clear of the notch 23, and as the carrier shifts in the direction aforesaid, the members 47 and 48 are brought into engagement with the contacts 52 and 56, thereby closing the ignition circuit. After the arm 81 has cleared the notch 23, the bar of the locking element can be elevated so that the knobs 16 and 19 will be clear of the plugs of the cutoffs 4 and 8, under such conditions permitting of the opening of the fuel supply line or lines. When the bar of the locking element is shifted upwardly, it is retained in its elevated position by the lug 83 engaging in the notch 84.

When it is desired to close the fuel supply and open the ignition system, the bar of the locking element is lowered until it is engaged and retained by the lug 83 seating in the notch 85, and the disks 64 are so set that the shaft 62 can be shifted to receive the locking member 74. The support 61 is then shifted in a direction towards the left to receive the locking member 74 and as said support moves to the left the shifting member 82 engaging the carrier 46 will move the same therewith, under such conditions opening the ignition system or circuit. After the locking member 74 has been seated in the shaft 72, the disks 64 are moved from set position, and under such conditions act to close the permutation locking mechanism, and the locking element will be retained in position to close the fuel supply and the ignition system will be maintained open.

The carrier, in connection with the members 47, 48 provides what may be termed a controller for the ignition system. The member 82 forms what may be termed a combined shifting and locking means for the controller and also a shifting means for the arm 81, and the latter constitutes a locking arm for the locking element of the device. The controller is locked in normal position by the member 82, and when shifted from normal position the member 82 shifts the locking arm 81 to release the locking element. When the locking arm 81 is moved to normal position, that is to say, to locking engagement with the locking element, the member 82 provides means for shifting the controller to normal position.

It is thought that the many advantages of an attachment for the purpose set forth and in accordance with this invention, can be readily understood, and although the preferred embodiment of the invention is as illustrated and described, yet it is to be understood that changes in the details of construction can be had which will fall within the scope of the invention as claimed.

What I claim is:—

1. A locking attachment for the purpose set forth comprising the combination with a shiftable locking element for a fuel supply and a shiftable controller for an ignition system, of a permutation locking mechanism including a locking arm for said element and a combined shifting and locking member for said controller.

2. A locking attachment for the purpose set forth comprising the combination with a shiftable locking element for a fuel supply and a shiftable controller for an ignition system, of a permutation locking mechanism including a locking arm for said element and a combined shifting and locking member for said controller, said member carried by said arm.

3. A locking attachment for the purpose set forth comprising the combination with a shiftable locking element for a fuel supply and a shiftable controller for an ignition system, of a permutation locking mechanism including a locking arm for said element and a combined shifting and locking member for said controller, said controller providing means when shifted to close the ignition system for moving said member and shifting said arm to release said element.

4. A locking attachment for the purpose set forth comprising the combination with a shiftable locking element for a fuel supply and a shiftable controller for an ignition system, of a permutation locking mechanism including a locking arm for said element and a combined shifting and locking member for said controller, said member carried by said arm, said controller providing means when shifted to close the ignition system to move said member therewith thereby shifting said arm to release said element, and said member providing means when said arm is returned to locking position to shift the controller to normal position.

5. In a locking attachment for the purpose set forth, a permutation locking mechanism including a stationary locking member, a shiftable supporting means carrying a plurality of setting disks associated with said member, a fuel supply locking arm extended from and bodily shiftable with said means, and a circuit controller combined shifting and locking member carried by and bodily shiftable with said arm.

6. In a locking attachment for the purpose set forth, a permutation locking mechanism including a stationary locking member, a shiftable supporting means carrying a plurality of setting disks associated with said member, a fuel supply locking arm extended from and bodily shiftable with said means, a circuit controller combined shifting and locking member carried by and bodily shiftable with said arm, and means for detachably holding said disks in set position.

7. In a locking attachment for the purpose set forth, the combination with a vertically movable locking element for a fuel supply, of a permutation locking mechanism including a horizontally shiftable locking arm for said element, and combined guide and retaining means for and extended through said element.

In testimony whereof, I affix my signature hereto.

JOSEPH CARTELLI.